(12) United States Patent
Adamczyk et al.

(10) Patent No.: US 9,175,720 B2
(45) Date of Patent: Nov. 3, 2015

(54) BALL PIN AND BALL JOINT

(75) Inventors: Dirk Adamczyk, Lemforde (DE);
Wolfgang Kleiner, Wagenfeld (DE);
Klaus Pape, Damme (DE); Wolfgang Eulerich, Osnabruck (DE); Martin Rechtien, Neuenkirchen (DE); Thomas Wiegmann, Osnabruck (DE); Manfred Heidemann, Belm-Vehrte (DE); Jochen Kruse, Osnabrueck (DE); Johannes Tabor, Damme (DE); Rainer Jasper, Rastede (DE); Ulrich Schefzyk, Osnabrueck (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/598,805

(22) Filed: Aug. 30, 2012

(65) Prior Publication Data

US 2013/0071175 A1    Mar. 21, 2013

(30) Foreign Application Priority Data

Sep. 19, 2011 (DE) .......................... 10 2011 082 920

(51) Int. Cl.
*F16C 11/06* (2006.01)

(52) U.S. Cl.
CPC ......... *F16C 11/0604* (2013.01); *F16C 2223/10* (2013.01); *F16C 2223/14* (2013.01); *Y10T 403/32631* (2015.01)

(58) Field of Classification Search
USPC ................... 403/52, 57, 76, 77, 90, 114, 115, 403/122–144
See application file for complete search history.

(56) References Cited

U.S. PATENT DOCUMENTS

| 3,401,963 | A | * | 9/1968 | Wehner | 403/131 |
| 4,035,200 | A | * | 7/1977 | Valentijn | 148/283 |
| 4,144,626 | A | * | 3/1979 | McEowen | 29/898.051 |
| 4,881,983 | A | * | 11/1989 | Smith et al. | 148/217 |
| 5,299,394 | A | * | 4/1994 | Surdacki | 451/50 |

(Continued)

FOREIGN PATENT DOCUMENTS

| DE | 203 20 846 U1 | 3/2005 |
| DE | 10 2006 043 067 A1 | 3/2007 |

(Continued)

OTHER PUBLICATIONS

German Search Report issued on Apr. 4, 2013 for the corresponding German application.

*Primary Examiner* — Joshua Kennedy
(74) *Attorney, Agent, or Firm* — Davis & Bujold, P.L.L.C.; Michael J. Bujold

(57) ABSTRACT

A ball joint with a ball pin and a steel ball pin with a joint ball. The ball joint and ball pin are suitable for use when, for example, solid-on-solid friction predominates under high static pre-loading or high operational loads and with small joint movements. A portion of the surface of the ball pin has surface layer hardening in order to increase a fatigue strength of the ball pin. The ball pin and the ball joint, on portion of the ball pin without the any surface layer hardened, includes a nitrided layer as wear protection. The ball pin and the ball joint provide an advantageous combination of high fatigue strength, good corrosion protection and high wear-resistance. The nitrided layer of ball joints, previously only regarded as improving corrosion protection, also functions as a wear protection. Thus, these ball pins overcome the mutual exclusion between surface layer hardening and nitriding.

15 Claims, 1 Drawing Sheet

(56) References Cited

U.S. PATENT DOCUMENTS

| | | | | |
|---|---|---|---|---|
| 5,679,411 A | * | 10/1997 | Hoppe | 427/528 |
| 6,059,480 A | * | 5/2000 | Maughan et al. | 403/131 |
| 6,113,303 A | * | 9/2000 | Buhl et al. | 403/282 |
| 7,661,902 B2 | * | 2/2010 | Brunneke | 403/141 |
| 2008/0145141 A1 | * | 6/2008 | Broeker et al. | 403/39 |
| 2009/0003927 A1 | * | 1/2009 | Howes et al. | 403/131 |
| 2010/0243109 A1 | * | 9/2010 | Baudis | 148/242 |
| 2012/0070224 A1 | * | 3/2012 | Losche et al. | 403/227 |
| 2013/0071174 A1 | * | 3/2013 | Pape | 403/122 |
| 2013/0071175 A1 | * | 3/2013 | Adamczyk et al. | 403/122 |

FOREIGN PATENT DOCUMENTS

| | | |
|---|---|---|
| DE | 10 2007 060 085 A1 | 6/2009 |
| DE | 10 2008 012 762 A1 | 9/2009 |
| DE | 10 2008 040 689 A1 | 2/2010 |
| DE | 10 2009 016 079 A1 | 10/2010 |
| WO | 2009/109303 A1 | 9/2009 |
| WO | 2010/112611 A1 | 10/2010 |

* cited by examiner

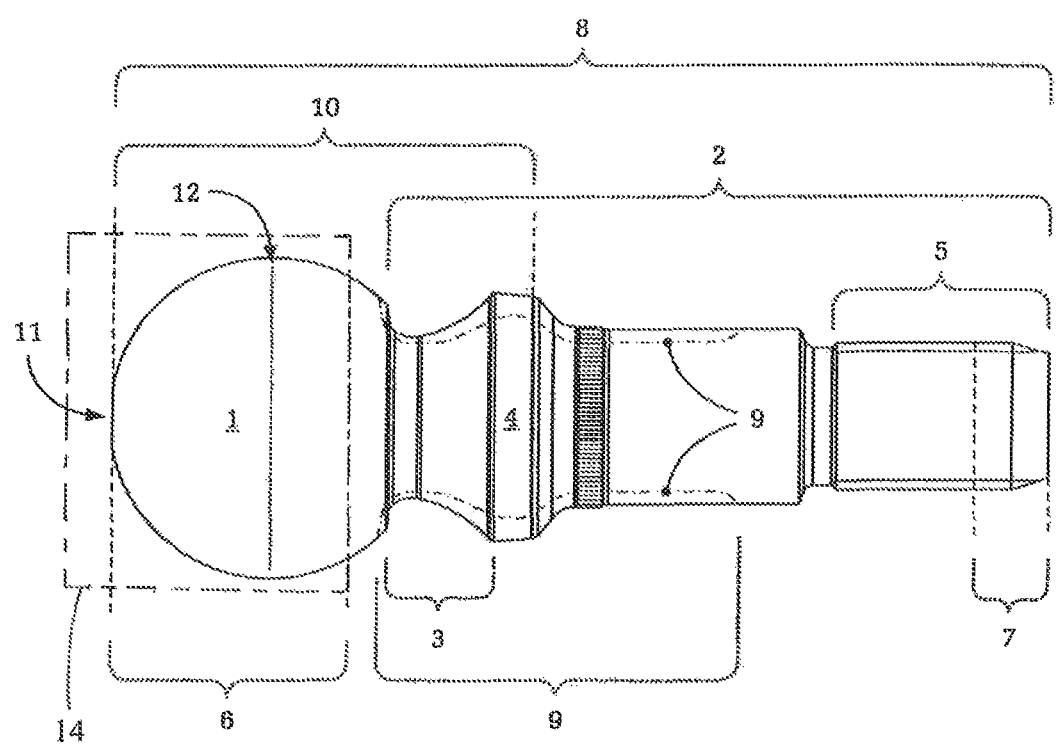

BALL PIN AND BALL JOINT

This application claims priority from German patent application serial no. 10 2011 082 920.2 filed Sep. 19, 2011.

FIELD OF THE INVENTION

The invention concerns a ball pin made of steel and a ball joint.

BACKGROUND OF THE INVENTION

In the case of load-bearing joints subjected to static loading, for example in the chassis area of a motor vehicle, in certain situations (such as periods of rest in combination with only minimal joint movements, or freeway driving) the tribological system of the joint is particularly severely loaded, and in some circumstances this can result in premature wear or failure of the joint. This is related to the fact that in these situations, lubricant present in the ball joint is partially expressed out of the contact area between the ball pin and the bearing shell due to the high load in combination with at most small movements of the joint. Because of this the mixed friction that always exists in a ball joint, namely between fluid friction and solid-on-solid friction, is displaced more markedly toward solid-on-solid friction, with corresponding disadvantageous consequences for the wear of the joint. Another problem known to affect ball joints is corrosion, particularly in the area of the ball pin sealed by sealing bellows, and—if moisture penetrates into the ball joint—also in the bearing gap between the joint ball and the ball socket. This too increases the wear of the joint and can result in the onset of joint play and ultimately in failure of the joint.

From the prior art corrosion-protected ball pins and also ball pins with surfaces protected against wear or ball pins with greater fatigue strength are known. According to the prior art enhanced fatigue strength and wear resistance are primarily achieved by improving the material properties by heat treatment or by hardening of the surface layer, in the latter case particularly on the surface of the ball pin.

A known measure against corrosion in the area of the ball pin that is sealed by the sealing bellows or in the contact zone between the joint ball and the ball socket consists in the use of nitrided and then oxidized ball pins. According to existing knowledge nitriding of the ball pin serves directly to enhance corrosion protection, while the subsequent oxidation seals the pores produced during nitriding, which increases the corrosion resistance still more. Thus, according to existing knowledge the oxidation subsequent to nitriding serves only to improve the corrosion properties of an otherwise bare steel ball pin.

In the treatments known from the prior art nitriding and surface layer hardening are mutually exclusive, since either the surface hardening is impaired due to the high process temperatures required for nitriding, or conversely, prior nitriding and hence the corrosion protection are destroyed again by a surface layer hardening process. The problem is that in relation to high fatigue strength or load-bearing and wear resistance as well, the desired surface layer hardening of the ball pin should typically take place in the same surface areas of the pin which should also be protected by the nitriding treatment, namely primarily in the area of the joint ball and if necessary in the area of the ball pin that is sealed by the sealing bellows.

In summary therefore, the problem is that on the one hand the nitriding of the ball pin desired with a view to corrosion protection, and on the other hand the surface layer hardening desired with a view to long life and good wear resistance, have until now been mutually exclusive for a ball pin—at any rate so far as was known from the prior art.

SUMMARY OF THE INVENTION

Against that background the purpose of the present invention is to provide a ball pin and a ball joint with which high fatigue strength, good wear resistance and thus long life are achieved, in particular under operating conditions with static pre-loading and micro-movements, or under high operating loads. Reduced corrosion protection in some areas of the ball pin, for example in the sealed area, is acceptable in favor of wear protection or compensated by other technical means such as an additional, corrosion-protected slide-ring. In particular, however, the previous mutual exclusion between surface layer hardening on the one hand and nitriding/oxidation on the other hand, that exists in the prior art, should be overcome so as, really for the first time, to achieve improved wear protection even with pins having a hardened surface layer.

The ball pin, made of steel, has been treated on at least part of its surface to increase the surface layer hardness (in particular to increase the operating and fatigue resistance), and is intended for use under high static pre-loading and/or micro-movement conditions and high operational loads, i.e. when joint movements are small or absent and when solid-on-solid friction predominates in the joint gap, at least at times.

Ball pins and ball joints are characterized in that wear protection is imparted by a nitrided layer on the ball pin. The nitrided layer is formed on part of the surface of the ball pin, and the part of the ball pin's surface provided with the nitrided layer is not surface-layer-hardened. For the partial nitriding of ball pins, suitable methods besides gas nitriding are plasma nitriding or plasma nitro-carburizing.

In this case the background for the invention consists in the applicant's insight that a nitride layer on the surface of the surface of the ball pin not only improves the corrosion behavior of a ball pin and ball joint (as known from the prior art), but in addition results in considerably improved wear behavior of the bearing.

This is particularly true under the boundary conditions mentioned earlier, namely high static pre-loading or operating loads, for example when the ball joint has been at rest for prolonged periods during which micro-movements and thus solid-on-solid friction have been predominant.

The applicant realized that the divergent (and even mutually exclusive in the prior art) demands on a ball pin, both with regard to hardness/fatigue strength and corrosion protection, and with regard to wear resistance, can be fulfilled if nitriding (for corrosion protection, and wear protection when solid-on-solid friction predominates), and surface layer hardening (for strength, fatigue resistance and wear protection) are carried out on discrete parts of the ball pin in such manner that on the one hand the requirements are optimally satisfied by a ball joint of the type mentioned at the start, but on the other hand the previously existing mutual exclusion of surface layer hardening and nitriding is eliminated.

In other words, this means that by virtue of the invention the nitriding of the ball pin (in any case known from the prior art for the purpose of improving the corrosion behavior of ball joints) can now be used to achieve a definite improvement of the wear behavior of the ball joint as well, in that at least part of the surface of the ball pin (without surface layer hardening) is provided with a nitrided layer acting in its new role as wear protection.

Thus, even surface layer hardened and hence particularly operationally durable and fatigue resistant ball pins can now be provided with additional corrosion and wear protection, and hence with the desired suitability for use when solid-on-solid friction is predominant (during periods of idleness or with micro-movements), which according to the doctrine of the prior art was impossible because of the mutual exclusion of surface layer hardening and nitriding, and because the advantages of nitriding as wear protection for ball joints had not previously been recognized.

For the application concerned surface layer hardening and nitriding are not mutually exclusive, since in the context of the present invention they are located in different areas of the ball pin; for example the surface layer hardening on the one hand in the neck and shaft areas which are loaded particularly severely in relation to alternating bending strength, and on the other hand the nitriding (here primarily as wear protection) in the bearing contact area of the ball pin between the joint ball and the bearing shell, which is particularly prone to wear.

Thus, the invention provides surface-layer-hardened pins with high fatigue strength along with high wear protection.

A preferred embodiment of the invention provides that at least over part of its surface the ball pin also has an oxide layer, in particular a layer of iron oxide. The oxide layer, which covers at least the parts of the ball pin that have been nitrided, serves to ensure additional stability of the nitrided layer in relation both to corrosion protection and to the stabilization and further improvement of the wear protection associated with the nitrided layer.

The invention can be implemented regardless of which portions of the surface of the ball pin are surface layer hardened and which (other) portions of the surface are provided with a nitrided layer, provided that the areas with different surface treatments are associated with the different surface requirements in the areas concerned.

However, in a preferred embodiment of the invention, the part of the surface of the ball pin that has no surface layer hardening but instead a nitrided layer, is on the joint ball, and indeed in a bearing contact area between the joint ball and the bearing shell. In this way the bearing contact area between the joint ball and the bearing shell, which is exposed particularly severely to wear—especially under high static pre-loading or when micro-movements occur while solid-on-solid friction is predominant—can be given a coating in the form of the nitrided layer which provides protection from both wear and corrosion. At the same time the remainder of the ball pin's surface can be surface layer hardened as before (if applicable), so as also to increase the fatigue strength of the ball pin.

In a further preferred embodiment of the invention, the joint ball has a nitrided layer and if necessary an oxide layer as well, over a bearing contact area extending from its pole to beyond its equator. In this case the remainder of the joint ball's surface is not provided with a nitrided layer. Preferably the joint ball has surface layer hardening in those portions of its surface which have no nitrided layer.

In this way a ball pin can be obtained which, in the area of the joint ball that is exposed mainly to wear and/or corrosion (namely extending from the pole of the joint ball most remote from its shaft and as far as beyond the equator of the joint ball), has particularly good wear behavior and good corrosion protection thanks to the nitriding, while at the same time the areas at the transition between the joint ball and the shaft, which are mechanically severely loaded in terms of fatigue strength, can advantageously undergo surface layer hardening there.

Thus the limitation still existing in the prior art, according to which nitriding treatment and surface layer hardening on a ball pin have previously been mutually exclusive, has now been eliminated. Accordingly, the properties of the ball pin can be optimized to the effect that nitriding (and if necessary oxidation) and surface layer hardening can be carried out, in each case, in the specific areas of the ball pin in which they produce the optimum result in relation to wear protection and fatigue strength respectively.

In a further preferred embodiment of the invention the zone in which the ball pin is surface layer hardened extends over a neck area, a seal area and at least in part over a shaft area of the ball pin. In this way the mechanically severely loaded parts of the ball pin (especially in relation to bending and fatigue strength) can be surface layer hardened, whereas the zone of the joint ball that is mainly exposed to wear and/or corrosion, namely between its pole and equator, is not surface layer hardened and can therefore be nitrided (and, if needs be, also oxidized) there, which is particularly desirable for wear resistance and corrosion resistance.

The threaded area of the ball pin can in this way also be exempted from surface layer hardening and instead provided with a nitrided (and/or oxide) layer, in order to produce better corrosion resistance particularly in the end portion of the ball pin thread while at the same time not impairing the necessary toughness of the thread.

Against this background, according to a further preferred embodiment of the invention it is provided that the ball pin also has a nitrided layer (and therefore no surface layer hardening) in at least parts of the shaft area and/or the ball pin thread area.

In further preferred embodiments of the invention, the ball pin can in addition be polished and/or tempered, even at least in some areas. The polishing process can optionally be carried out before surface layer hardening but also after surface layer hardening, the latter option especially if the requirements relating to dimensional precision, surface quality and/or strength in surface layer hardened areas are particularly strict. In such a case, the polished area can include in particular the (for example partially nitrided) entire joint ball as well as the neck area and the seal area of the ball pin.

BRIEF DESCRIPTION OF THE DRAWINGS

Below, the invention is explained in more detail with reference to a drawing which shows only one example embodiment. The sole FIGURE shows a ball pin according to the present invention, viewed from the side.

DETAILED DESCRIPTION OF THE PREFERRED EMBODIMENTS

The FIGURE shows the ball pin, which comprises a joint ball 1, a shaft area 2, a neck area 3, a seal area 4 (against which a sealing bellows rests) and a threaded area 5.

In this case, the ball pin shown is provided with a nitrided layer over a portion 6 of the joint ball 1 that extends from the pole 11 as far as beyond the equator 12 and also in the area of the thread run-out 7. As always, in the areas 6 and 7 the nitrided layer serves not only for good corrosion protection but also—as the applicant recognized—it is also very wear resistant. Thus, the ball pin shown is particularly suitable for use under high static pre-load and/or for frequent operating periods with micro-movements, during which solid-on-solid friction between the ball pin and the ball socket predominates.

Furthermore, the example embodiment of a ball pin illustrated has over its entire length or surface 8 an oxide layer, in particular a layer of iron oxide. The oxide layer results in a further improvement of the corrosion protection and —as the applicant knows—also produces a further increase of the wear resistance in the area of the joint ball 1, specifically in the bearing contact area between the joint ball 1 and the ball socket (bearing shell) 14 of the ball joint.

In this case the ball pin shown is additionally provided with surface layer hardening in the area 9 (also indicated with dot-dash lines). This is the area in which the highest mechanical loads occur, to which extra care is therefore devoted by virtue of the surface layer hardening aimed at increasing the fatigue strength of the ball pin.

Finally, the embodiment of the ball pin shown also has a polished area 10. By virtue of the polishing of the ball pin in the area 10, both the corrosion resistance and also the wear resistance and fatigue strength are increased still more.

Thus, thanks to the invention the ball pin can be provided, in its sections or surface areas that are subject to specific requirements, with the respectively necessary properties without the consequent creation of any functional conflicts or (as in the prior art) mutual exclusions as regards their surface treatment or the achievement of the requirements profile desired.

INDEXES

1 Joint ball
2 Shaft area
3 Neck area
4 Seal area
5 Threaded area
6 Nitrided area, bearing contact area
7 Nitrided area
8 Surface, oxidized area
9 Hardened zone
10 Polished area
11 Pole area
12 Equator area

The invention claimed is:

1. A ball joint comprising:
a bearing shell;
a steel ball pin having a joint ball for forming the ball joint with the bearing shell, for use under either high static pre-loading or high operating loads,
at least a portion of a surface of the ball pin having a surface layer hardening (9) for increasing a fatigue strength of the ball pin,
another portion of the surface of the ball pin, at least in an area of bearing contact between the joint ball and the bearing shell is free of the surface layer hardening, and has a nitrided layer (6) for providing wear protection, and
a portion of the surface of the joint ball (1) is free from any nitrided layer and has the surface layer hardening.

2. The ball joint according to claim 1, wherein at least a portion of the surface (8) of the ball pin has only an oxide layer, the portion of the surface of the ball pin having only the oxide layer is located axially between the area of bearing contact and the portion of the surface of the ball pin comprising the surface layer hardening.

3. The ball joint according to claim 1, wherein the area of bearing contact of the ball pin is located on the joint ball (1) and has at least one of the nitrided layer and an oxide layer, the area of bearing contact extending from a pole (11) of the joint ball (1) at least as far as an equator (12) of the joint ball (1), and a another portion of the surface of the joint ball (1) is free of the nitrided layer.

4. The ball joint according to claim 1, wherein the portion of the ball pin having the surface layer hardening extends over a neck area (3), a seal area (4) and over a portion of a shaft area (2) of the ball pin, and another portion of the shaft area is free of the surface layer hardening and comprises at least one of a nitrided layer and an oxide layer.

5. The ball joint according to claim 1, wherein at least some areas (10) of the surface of the ball pin are polished.

6. The ball joint according to claim 1, wherein at least some areas of the surface of the ball pin are tempered.

7. A ball joint comprising:
a bearing shell,
a steel ball pin having a joint ball (1) for forming the ball joint with the bearing shell, for use under high static pre-loading,
a portion of a surface of the ball pin comprising a surface layer hardening (9) for increasing a fatigue strength of the ball pin,
a portion of a surface of the joint ball, at least in a bearing contact area between the joint ball and the bearing shell has a nitrided layer (6) for providing wear protection and is free from the surface layer hardening,
another portion of the surface of the joint ball is free from the nitrided layer, and
the portion of the surface area of the joint ball (1) that is free from any nitrided layer has the surface layer hardening.

8. The ball joint according to claim 7, wherein at least portion of the surface (8) of the ball pin has an oxide layer.

9. The ball joint according to claim 7, wherein the bearing contact area of the ball pin is located on the joint ball (1) and has at least one of the nitrided layer and an oxide layer, the bearing contact area extending from a pole (11) of the joint ball (1) at least as far as an equator (12) of the joint ball (1), and a remaining surface of the joint ball (1) is free of the nitrided layer.

10. The ball joint according to claim 7, wherein the portion of the ball pin having the surface layer hardening extends over a neck area (3), a seal area (4) and a portion of a shaft area (2) of the ball pin, and another portion of the shaft area has a nitrided layer and is free from surface layer hardening.

11. The ball joint according to claim 10, wherein the ball pin has a nitrided layer on at least a portion of at least one of the shaft area (2) and a threaded area (5) thereof, and the portion of the at least one of the shaft area (2) and the threaded area (5) having the nitrided layer is free from the surface layer hardening.

12. The ball joint according to claim 7, wherein at least some areas (10) of the surface of the ball pin are polished.

13. The ball joint according to claim 7, wherein at least some areas of the surface of the ball pin are tempered.

14. The ball pin of the ball joint according to claim 7, wherein the ball pin is a steel ball pin and comprises the joint ball (1), and at least an axial portion of the surface of the ball pin has an oxide layer.

15. A ball joint comprising:
a bearing shell;
a steel ball pin having a joint ball for forming the ball joint with the bearing shell, for use under either high static pre-loading or high operating loads;
at least a portion of a surface of the ball pin having a surface layer hardening (9) for increasing a fatigue strength of the ball pin;
another portion of the surface of the ball pin, at least in a bearing contact area between the joint ball and the bearing shell is free of the surface layer hardening, and has a nitrided layer (6) for providing wear protection;

the portion of the ball pin having the surface layer hardening extends over a neck area (3), a seal area (4) and at least partially over a shaft area (2) of the ball pin; and wherein the ball pin has a nitrided layer on at least a portion of at least one of the shaft area (2) and a threaded area (5) thereof, and the portion of the at least one of the shaft area (2) and the threaded area (5) having the nitrided layer is free from the surface layer hardening.

* * * * *